United States Patent [19]
Förster

[11] 3,825,821
[45] July 23, 1974

[54] MAGNETIC PARTICLE FLAW DETECTOR USING AN ELECTRON BEAM SCANNER TO GENERATE PULSES REPRESENTATIVE OF THE IMAGE OF THE FLOW PROJECTED ON THE SCANNER SCREEN

[76] Inventor: Friedrich Martin Förster, Grathwohlstrasse 4, D-7410 Reutlingen, Germany

[22] Filed: Feb. 20, 1973

[21] Appl. No.: 334,088

[30] Foreign Application Priority Data
Feb. 26, 1972 Germany............................ 2209146

[52] U.S. Cl...................... 324/38, 250/302, 324/37
[51] Int. Cl........................................... G01r 33/12
[58] Field of Search ............... 324/38, 37; 250/302; 313/65 R, 65 T

[56] References Cited
UNITED STATES PATENTS

| | | | |
|---|---|---|---|
| 2,798,966 | 7/1957 | Summerhayes, Jr.............. | 313/65 R |
| 3,073,212 | 1/1963 | Dunsheath et al.................... | 324/38 |
| 3,111,647 | 11/1963 | Heizer............................... | 313/65 R |
| 3,350,591 | 10/1967 | Van Asselt........................ | 313/65 T |
| 3,480,855 | 11/1969 | Lorenzi................................ | 324/38 |
| 3,676,959 | 7/1972 | Forster................................ | 324/37 |

Primary Examiner—Robert J. Corcoran
Attorney, Agent, or Firm—George J. Netter, Esq.

[57] ABSTRACT

In testing ferromagnetic bodies for surface defects by magnetic powder techniques, an image of a magnetized test body treated with magnetic powder is formed on the screen of an electron beam scanner arranged to scan the image and generate signals representing image intensity. The scanner develops pulse signals on scanning of defects marked by the magnetic powder which serve to identify the existence and magnitude of such defects. Such signals are utilized to spray mark defect locations or actuate processing circuits to identify magnitude and kind of defects.

8 Claims, 9 Drawing Figures

MAGNETIC PARTICLE FLAW DETECTOR USING AN ELECTRON BEAM SCANNER TO GENERATE PULSES REPRESENTATIVE OF THE IMAGE OF THE FLOW PROJECTED ON THE SCANNER SCREEN

This invention relates to a method and apparatus for testing of metal parts, and, more particularly, to a method and apparatus for testing ferromagnetic bodies, such as semi-finished and mass-produced parts, for defects, using magnetic powder techniques.

BACKGROUND OF THE INVENTION

The magnetic powder technique is one of the oldest non-destructive testing procedures. It consists in the exposure of the ferromagnetic parts to be tested to a magnetic field whose direction has a sufficiently large component perpendicular to the expected direction of defect. The magnetism generated by the magnetic field causes lines of force to emanate into the surrounding medium as the magnetic lines of force contact a discontinuity such as a crack, shrinkhole, lap or the like.

If the magnetized body comes into contact with an emulsion of magnetic powder or with dry magnetic powder, then a force will be exercised on the powder particles by the lines of force emitted by the defect which results in the magnetic powder collecting along the defect in the pieces.

The force exercised on the magnetic powder particles is proportional to the field strength acting at the defect location and to the field strength gradient across the carck. In other words, the magnetic field strength existing across the crack generates a magnetic dipole in a magnetic powder particle, on which a force is exercised by the field strength gradient, and which force is proportional to the product of the magnetic dipole moment of the powder particle and the field strength gradient across the crack.

Both the magnetic field strength and the field strength gradient increase in a defined manner with the depth of the crack in the surface of the piece. This means that with increasing depth of crack, the force attracting a magnetic powder particle increases according to a known law. Thus, the amount of magnetic powder collecting at a crack will increase with increasing crack depth.

In order to make the magnetic powder collected at the crack more clearly visible — generally it will be a very narrow line — a fluorescent substance may be added to the magnetic powder, and this emits visible light when subjected to ultraviolet radiation. Since the band of magnetic powder is wider for a deeper crack, more light is emitted under ultraviolet radiation than for a crack of less depth.

In principle, therefore, it should be possible to deduce the depth of a defect from the brightness of the bands of powder. However, the human eye is incapable of making a satisfactorily quantitative judgment of the amount of light emitted for estimating the defect depth, and this is for two reasons, for one, the logarithmic sensitivity behavior of the eye prevents quantitative estimation, and for another, the degree of eye adaptation constantly changes the "operating point" on the curve of eye sensitivity.

Not only is it impossible for an individual to make a quantitative assessment of the defect by looking at the fluorescent magnetic powder bands for these reasons, but, over a long period of time, such visual evaluation would also cause considerable physiological strain on the tester's eye. Long periods of work, in darkness and under ultraviolet radiation, are known to be so hazardous to health, that the tester'work in the darkroom looking at the magnetic powder has been considerably limited by the industrial safety authorities in various countries. Apart from the hazards to health caused by visual magnetic powder testing in a darkroom, a high incidence of errors is to be expected, due to the fatigue and strain of the tester — a fact which has been proved by numerous statistical surveys in steelworks.

There is, therefore, a generally felt need for a method of magnetic powder testing independent of the human eye and thus more objective. It is also clear that once the magnetic powder test has become objective, the way is open to the automation of this important method of testing.

A start has already been made toward an objective testing method. For example, a procedure has been reported in which steel rods are circularly magnetized by an axial current, and sprinkled with an emulsion of magnetic powder during magnetization. The bands of powder collecting at the cracks become fluorescent with ultraviolet radiation, and photomultipliers move around the specimen under investigation, converting the light from the powder into an electric signal.

A mechanically operated optical scanning device of this kind is very expensive, susceptible to breakdown and relatively slow, quite apart from the fact that the use of an emulsion of magnetic powder for sprinkling the specimens can lead to a contamination of the photoelectric apparatus circling the specimen.

Recently, it has been proposed that the magnetic powder test be automated by using a laser beam. Here, the beam is reflected from an oscillating mirror which sends the beam zigzagging to and fro over the test specimen, e.g., a steel billet on which areas of clinging magnetic powder have already been formed. If the laser beam intercepts a band while moving across the billet, the band will send out a light pulse for the duration of the beam's presence. A concave mirror is located over the test specimen, the dimensions of which must be larger the greater its distance from the test specimen. This mirror focuses the light pulses generated by the beam onto a photodiode which converts the light pulses into electric pulses which are transmitted to a recorder system for analysis.

The two attempts at automation of the magnetic powder test described above are both extremely expensive. For instance, for testing a square billet with the laser technique, it would be necessary to use four laser systems, with one mechanical beam-scanning device and one data processing system attached to each. Quite apart from this, a testing system which makes use of the very fine laser beam can hardly be considered suitable in the conditions which exist in steelworks where the environment is contaminated by dust, oil and vapors.

OBJECT AND SUMMARY OF THE INVENTION

It is, therefore, an object of this invention to avoid the disadvantages of known magnetic powder detection systems by providing an improved method in which no moving mechanical assemblies are used.

According to the present invention, there are provided a method and apparatus for testing ferromagnetic bodies for surface defects by the magnetic powder method, wherein an image of a magnetized test body treated with magnetic powder is formed on the screen of an electron beam scanner arranged to scan the image and generate a signal representing image density. The scanner develops pulse signals on scanning of defects marked by the magnetic powder which serve to identify the existence and magnitude of such defects.

DESCRIPTION OF PREFERRED EMBODIMENTS

Figure 1:
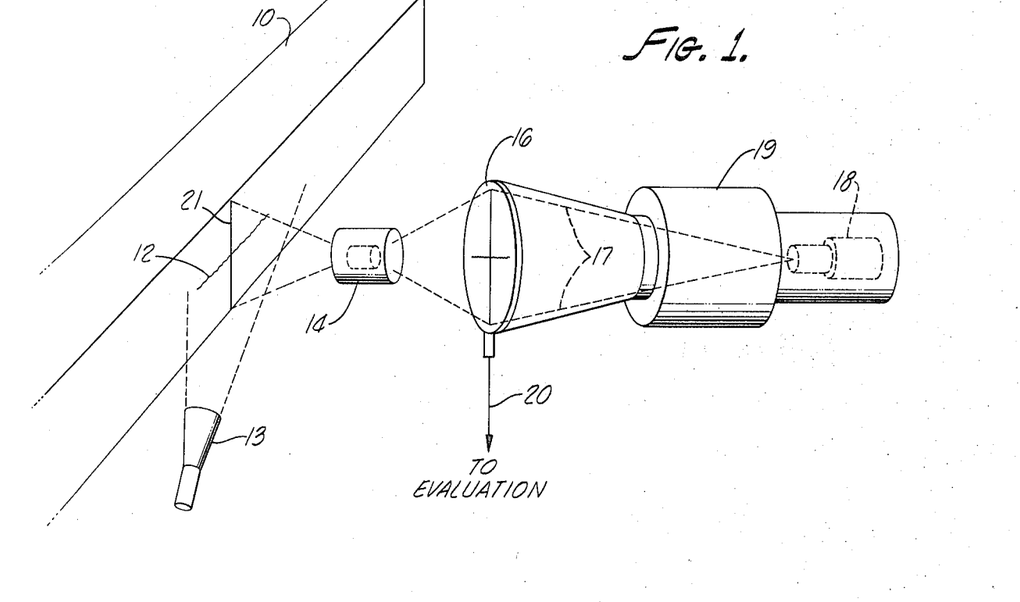
FIGS. 1 and 2 are schematic diagrams illustrating two arrangements for carrying out the invention.

The test specimen 10 in FIG. 1, with a crack or other surface defect 12 to which magnetic powder has adhered, is stimulated by intensive, i.e., focused, ultraviolet radiation from a lamp 13 so that the magnetic powder band glows brightly. The section of the specimen which is being examined is projected by means of a system of lenses 14 onto a semiconductor plate 16 which acts as a signal plate in the vacuum inside a glass bulb. This signal plate is scanned by a scanning beam 17 of slow electrons emitted by a gun 18, which beam is moved to and fro by a deflection coil means 19. In the process, electric voltages are generated at the electrode of the signal plate 16 by the inner photo effect when the electrode scanning beam 17 passes over a glowing powder band projected on the signal plate by the lens, or whenever there is any variation in the brightness of the surface under investigation such as when the magnetic powder method is used without fluorescent effects. Electric signals thus generated are available on a line 20 for recording and/or analysis.

Of course, for the conversion of the glowing powder or brightness variation into an electric voltage pulse, a system may be used which provides for an intermediary electronic projection of the photo cathode on the storage plate.

This purely opto-electronic scanning system has many advantages over the previously described methods using mechanical scanning of the specimens via rotating or oscillating components. First of all, the electron beam can scan the image of the test specimen projected on to the signal plate through the lenses, by movement to and fro along one line. A linear portion 21 of the test specimen in FIG. 1 is thus scanned. Whenever the electron beam 17 (scanning beam) crosses an image of a powder strip or band, in the course of the unidimensional scanning, an electric pulse is received on the signal plate which has an amplitude proportional to the brightness of the band.

Independently of whether the unidimensional scanning is a sinusoidal or a saw-toothed movement, the result will be the same as for the laser method with oscillating mirrors described above, but with the considerable advantages of a purely electronic method without the necessity of means for producing mechanical movement.

Scanning of the signal plate 16 with the inertialess electron scanning beam 17 can take place at a speed which is several orders of magnitude faster than with a mechanical system. This means that the material to be tested can pass through the testing device at a very high speed without loss of information on the geometric position and the brightness of the magnetic powder.

If a semi-finished product 10, rod, tube or billet, for example, is passed through the inertialess testing device at a speed of, say, 4 meters per second, and the electron beam scans the signal plate with, e.g., a sweep frequency of 40 KHz, then each tenth of a millimeter of the specimen will be scanned transversely to the direction of movement, since in one forty-thousandth of a second the product advances only 1/10 millimeter. As there is no inertia involved in the purely optical-electronic scanning of the semi-finished product, testing speeds of 40 meters per second with millimeter resolution are theoretically possible.

The coversion of the brightness of the magnetic powder into electric pulses proportional to the brightness by optical-electronic scanning of the test specimens transversely to the direction of movement permits the inertialess recording of data on all relevant details of the defect, if the defect is on the surface of the specimen.

The following details are of particular interest concerning defective behavior of the material being tested and these may be stored and analysed by a computer, printed out, recorded or marked on the semi-finished product:

1. Total defective length of piece tested.
2. The defect length as a percentage of the length of the tested piece (specific defect length).
3. Storage of the defect length for a certain production period for the product, e.g., originating from a batch, with repeated indication of the specific defect length, i.e., the defect length as a percentage of the length of the tested product.
4. Distribution of defects along length of product.
5. Distribution of defects across width of product, e.g., on the surfaces of square billets.
6. Subdivision of the defects listed in 1–5, into groups of different defect depths, e.g.,
    a. length of all indicated defects on the material tested,
    b. length of defects with a depth of over, say, 0.6 mm,
    c. length of defects with a depth of over, say, 1.4 mm., etc.
7. Number and location of special types of defect, such as laps, scales, etc., which may be particularly hazardous for certain production processes.

Further, with respect to (1) and (2) above, if the transport speed $v$ of the test specimen and the scanning frequency $n$ of the test specimen are known, then the scanning of the test specimen corresponds to a definite specimen length. If, for example, a steel billet is transported at a speed of 500 mm. per second, and the scanning frequency is set at 500 Hz, then each scan corresponds to a length $v/n$, i.e., one millimeter per billet length, for the given example.

If there is a crack on the billet with a powder band glowing under ultraviolet radiation, then when the electronic beam 17 passes once over the billet image transversely of the direction of transport, an electrical pulse is sent out from the storage plate 16 as the scanning beam in the billet image on the storage plate passes over the image of the glowing powder. If two or three pulses are emitted in the course of one scan of the electronic beam, then there are two or three defects on the section of the semi-finished product under observation, next to one another. In general, for the example selected here, i.e., $v/n = 1$, each pulse emitted by the storage plate corresponds to a defect length of 1 mm.

The same result may be obtained for a variable transport speed of the specimen. Thus on reference now to FIG. 2, a friction wheel 22, driving a pulse generator rolls on the material being tested, so that for each increment of movement, e.g., 1 mm. of the test specimen, a pulse is generated to actuate a pulse generator 23 for triggering one scan of the scanning beam in the sweep generator.

Figure 2:
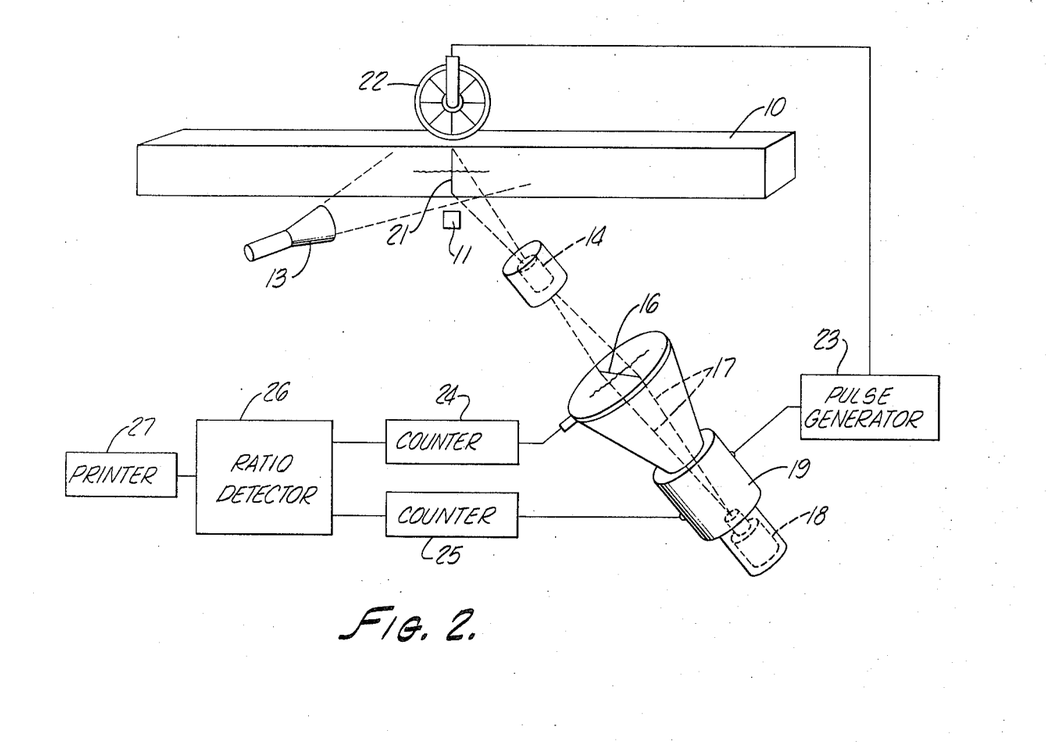

By counting in a counter 24 the brightness pulses, the defect length is obtained in basic length units, e.g., mm., and if the times the projected semi-finished product is scanned by the scanning beam are also counted in a counter 25, the defect length is obtained in the form of a fraction or percentage of the length of test specimen tested (specific defect length), by forming the ratio of the two values in a divider or ratio detector 26. The specific defect length can be recorded by a printer 27.

If photo cells, proximity switches 11, or the like are used to ensure that the scanning takes place only when a test specimen is shown on the storage plate, then the entire production may be monitored for defects. That is, in this case the numerical value in the counter 24 will provide the cumulative defect length (total number of pulses generated by the storage plate 16), whereas the other counter 25 will contain a numerical value corresponding to the cumulative length of the semi-finished product tested (total number of scans of the scanning beam, measured at the deflection coil 19).

The specific defect length, which is of special interest in steel production, for example, may be printed out by the printer 27 either for each billet, after every tenth or hundredth billet, after each work shift, or at the end of each batch processed, as is desired.

As well as this continuous statistical quality control there is also a considerable need i certain industries such as the steel industry, to use in defect information for marking the product and elimination of the defects. For example, if defect pulses are emitted, a spray gun may be actuated by delayed action, e.g., via a shift register, to mark the location of the defect on the test specimen with color and permit its subsequent removal by grinding, searing, etc.

Figures 3, 4:
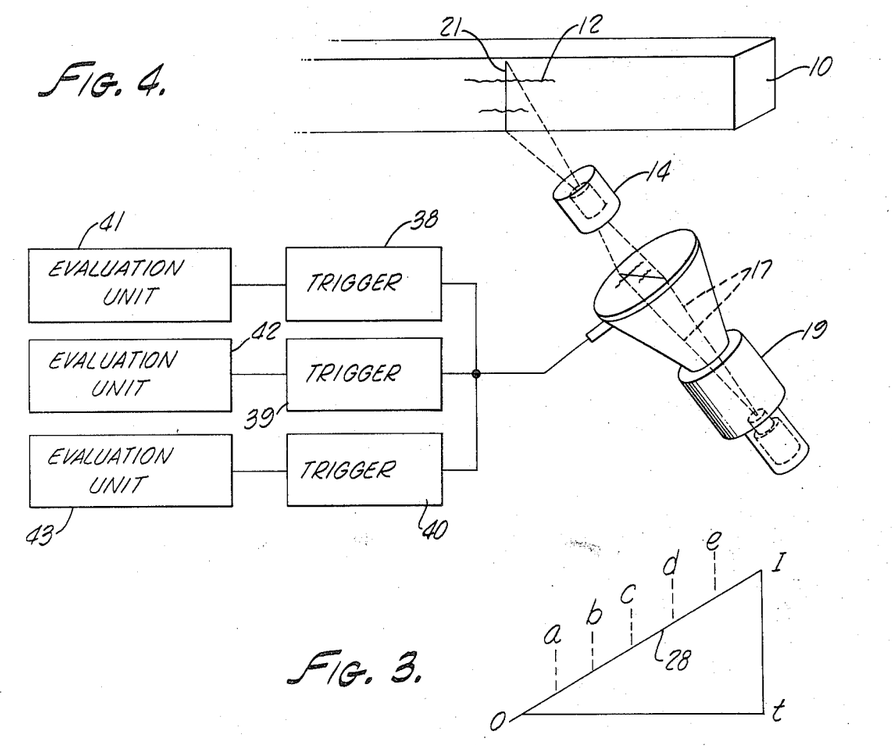
FIG. 3 is a graph of a scanner deflection current as a function of time showing identification of defect zones.
FIG. 4 depicts an arrangement for distinguishing between different crack depths.
Figure 9:
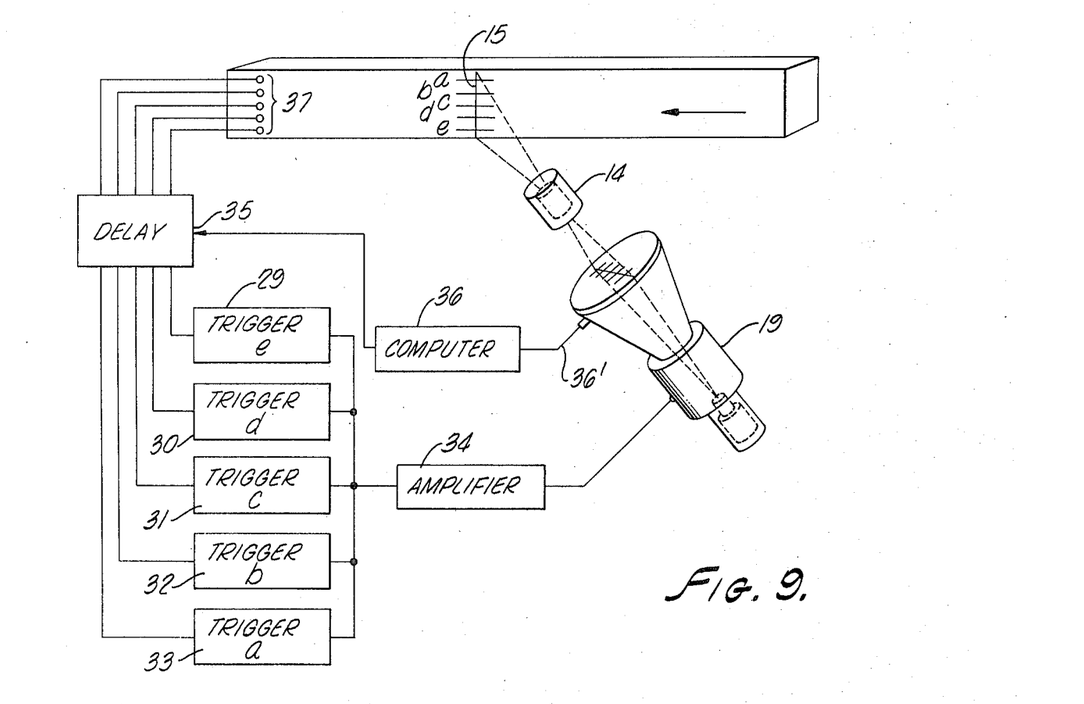
FIG. 9 illustrates an arrangement for locating defects along the line of scan.

If it is desired to determine the exact position of the defect on the length and width of the semi-finished product for marking or for automatic defect elimination, the scanning principle illustrated in FIGS. 3 and 9 may be used. The linearly increasing deflection current 28 for the electron beam, operates a series of triggers 29–33 $a - e$ via an amplifier 34, FIG. 9, with levels as illustrated in FIG. 3, corresponding to locations $a - e$ shown in both FIGS. 3 and 9. As each trigger sets, it resets the previous trigger.

If, for example, a billet surface is divided into five channels, it is possible by using a conventional electronic procedure to register or store the defect pulses from anywhere across the width of the billet associated with the appropriate channels, in storage and delay means within a storage delay means 35 which receive defect pulses from a computer 36 connected to the line 36'. It is also a simple matter to assign five spray guns 37 to the five trigger channels, which will then accurately mark the respective defect positions while the billet is passing through, the circuit 35 establishing a delay equal to the time taken for a point on the billet to move from the line 15 to the guns 37.

In the same manner, defect pulses indicating billet width and billet length may be stored and/or processed by the computer 36, and the pieces then guided to an automatic system for removal of defects by grinding or searing.

One significant advantage of this optical-electronic scanning procedure is that, under certain conditions, there is a definite relationship between the depth of the defect in the semi-finished product 10 and the brightness of the fluorescent powder under ultraviolet radiation. By selecting a suitable magnetizing field strength and certain types of magnetic powder, a certain correlation between crack depth and the amplitude of the voltage pulses emitted by the storage plate will be obtained in the crack depth range which is normally of interest. This experimentally proved fact has considerable economic consequences.

A serious disadvantage of the magnetic powder method was formerly thought to be that with visual examination there was no way of correlating defect depth and magnetic powder indications, for the reasons described above. In the steel industry there are specifications for the crack depths which are permissible for various products. For example, on a semi-finished product being subjected to heat treatment, a certain thickness of the surface material scales off. This means that only those defects need be removed in a defect elimination or cleaning process whose depth exceeds the thickness of the scale subsequently removed. On the other hand, there are semi-finished products which are processed in forges where even minimal defect depths are not permitted, as there is the danger that the piece might split.

Figure 5:
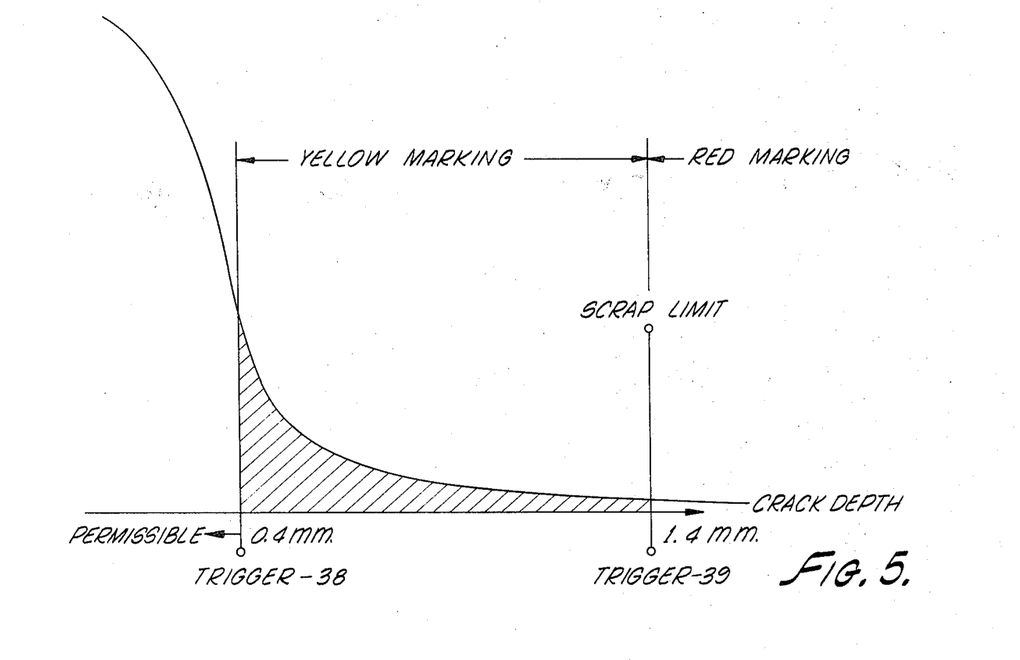
FIG. 5 is a graph illustrating defect frequency versus crack depth.

From numerous statistical studies in the steel industry on the incidence rates of cracks of various depths, it has been concluded that the incidence drops sharply for greater crack depths as shown in the curve in FIG. 5. A recognized disadvantage of the prior magnetic powder testing of semi-finished products lies in that normally a great deal of cleaning in excess of that actually needed to be done since with the subjective evaluation of defect indication it is impossible to determine whether the defect depth is in fact within the specified depth limits. As the costs of cleaning make up a considerable percentage of the total costs of billets, it is a substantial saving to be able to distinguish by the test method whether the depth of the cracks indicated is within the specified limits, i.e., may be ignored, or whether the cracks must be cleaned away.

It is a particular advantage of the scanning method described here that the height of the electric pulses obtained from the signal plate 16 are clearly correlated as to defect depth, in the required defect depth range. If the pulses corresponding to the degree of brightness of the powder band, and thus to the crack depth, are applied to a trigger whose respose threshold has been adjusted to the powder brightness corresponding to permissible crack depth, then we have obtained a quantitative method.

If, for example, three triggers 38, 39 and 40 (FIG. 4) with different response thresholds are used, cracks may be segregated into three different categories of depth, the defects in these categories being counted or otherwise handled separately by evaluation units 41, 42 and 43. By an appropriate adjustment of the response thresholds where only 38 and 39 are used, for example, it is possible to obtain an analysis of crack depths by having the first trigger 38 (FIGS. 4 and 5) respond to all defects with a depth of, say, over 0.4 mm. (specified defect depth), and the second trigger respond to all defects over 1.4 mm. Thus, only those defects will be cleaned which have been passed by trigger 38 (i.e., fall within the shaded area) but not passed by trigger 39, which classifies the latter as scrap, as the threshold of trigger 39 is set at the "scrap" limit for defect depth. This means that if there is a crack depth exceeding the "scrap" limit, the piece will not be cleaned, since it will be considered either too expensive to clean or impossible to maintain the geometric form of the piece as a specified cleaning depth will be exceeded.

The economic significance of the automatic classification into groups of different crack depth with the method described here lies in the fact that most of the cleaning work for defect elimination as shown in FIG. 5 is no longer required since only defects with a depth between the permissible depth and the depth at which defect elimination is no longer worthwhile are marked for subsequent cleaning (yellow marking as shown in FIG. 5). Defects with a depth exceeding the scrap limit, i.e., those indicated by trigger 39, may be marked with another color (red marking as shown in FIG. 5).

Still further, as FIG. 5 shows, the number of defects with a depth between permissible depth (specified limit) and the scrap limit makes up only a relatively small fraction of the total number of defects indicated by the powder method, so that with defect analysis according to the method described, only a fraction of the considerable sums formerly spent on defect elimination is now required and this considerably reduces the price of the semi-finished product.

Analysis of the voltage pulses generated by the glowing powder bands or strips projected on the signal plate, by using one or more triggers with fixed thresholds corresponding to defined defect depths, now permits extensive quality control of the steel products concerned. Not only is it possible to make a record of the total defect length of the products, the specific defect length as a percentage of the tested specimen length, etc., but also to classify the defect lengths into various defect depth groups with an electronic data processing system at the same time.

If, for example, defect depths, are classified into three groups by using three triggers, e.g., trigger 38 counting and measuring the length of all defects with a depth of over 0.4 mm., trigger 39 for all defects with a depth of over 0.8 mm., and trigger 40 all defects with a depth of over 1.2 mm., then the following data on defect depth is easily obtainable:

Group 1 = length of all defects with a depth between 0.4 and 0.8 mm.

Group 2 = length of all defects with a depth between 0.8 and 1.2 mm.

Group 3 = length of all defects over 1.2 mm. in depth.

If one considers that at present in the steel industry the information in the above three groups is only obtained with a great deal of trouble and expense and is inaccurate as well, e.g., using primitive methods for measuring the length of visible defects with a tape measure and the approximate defect depth by partial spot grinding to obtain the urgently required data on the quality of a product, then the procedure described above clearly represents an advance.

The semi-finished product under examination is put through the test system at the highest possible mechanical speed and all the data on the defect length of the various defect depth groups stored, printed or otherwise electronically processed while simultaneously rejecting the defect group with a depth beyond the permissible specified defect depth limit.

Figure 6:
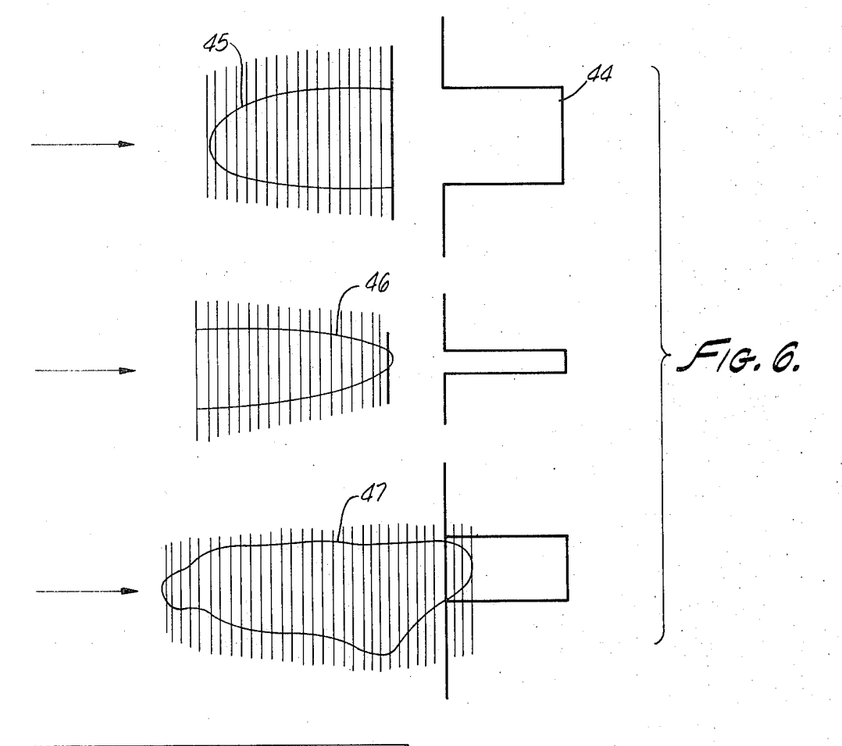
FIG. 6 illustrates the characteristics obtained on encountering scale defects in the practice of this invention.

Another serious problem is the recognition of scales and laps. These types of defects represent a hazard in subsequent processing, as a scale or lap can rise and block the continued transport of the semi-finished product. A scale or lap differs from one or several cracks in that it is characterized by changes, from scan to scan, in the spacing of the pulses emitted by the signal plate 16 during passage of the scanning beam over the image of the glowing powder. By comparison, the spacing of the pulses emitted for two or more longitudinal cracks is constant.

Figure 7:
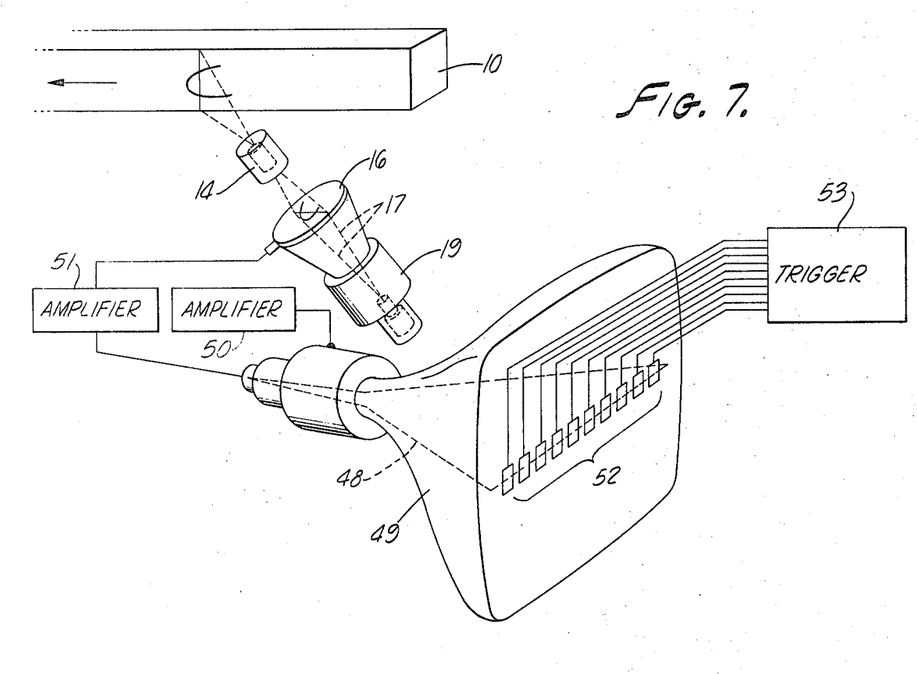
FIG. 7 shows an arrangement for distinguishing scale defects from other defects.

An alternate form of the invention particularly useful for distinguishing scales from other defects is illustrated by FIG. 7 where the electron beam 48 of a television tube 49 is controlled by a time base amplifier 50 to effect line synchronous scanning. The brightness of the beam 48 is controlled by the pulses generated by the signal plate 16 and amplified in an amplifier 51. Along the line of movement of the writing beam 48 moving unidimensionally across the face there are a number of photosensitive devices 52 mounted next to one another, activating a trigger 53 when a sufficient number of the devices 52 are illuminated.

An indication that scale is present is given by the fact that in a very short period of time the location of the projected powder bands or strips which produce an increased brightness of the writing beam will have wandered over a certain number of photosensitive devices 52 on the television tube and, because of the persistence of the tube phosphor, all such devices will be simultaneously illuminated.

The method and apparatus of FIG. 7 with a chain of photosensitive elements on the track of the writing beam, can also be used to determine the exact position of a defect on the width of a test specimen, e.g., billet. For example, as soon as the powder glows at a definite point on the billet the beam increases in brightness at the corresponding position in the television tube, and the photosensitive arrangement at this point emits a signal which may be used to control a spray gun in the channel concerned.

Figure 8:
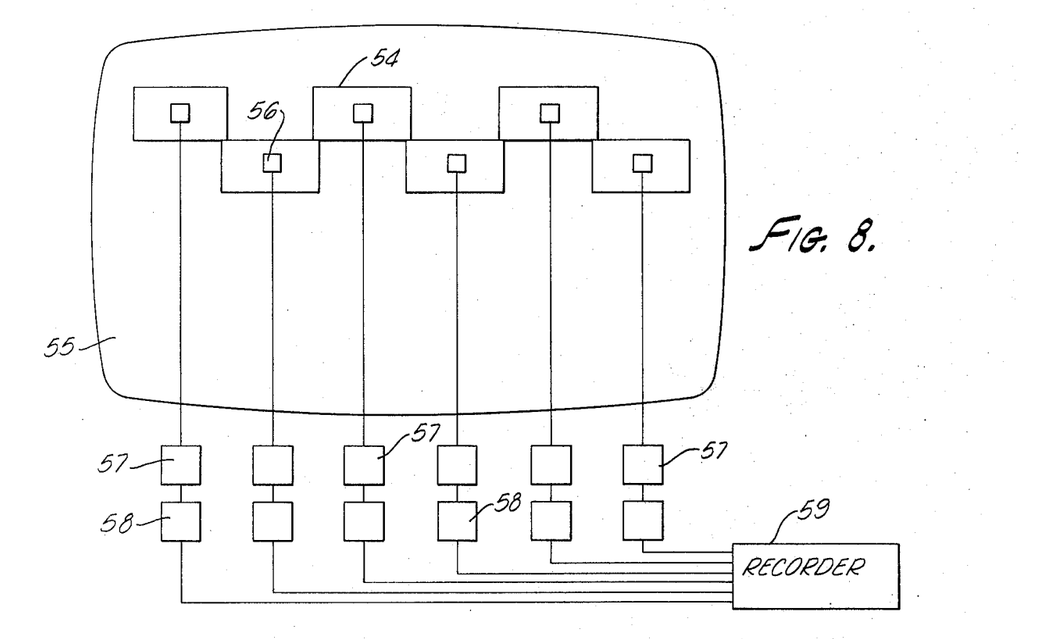
FIG. 8 illustrates another arrangement for locating defects along the line of scan of the electron beam.

Instead of complex electronic evaluating circuits to mark the exact position of the defect in the channels into which the surface of a billet is subdivided, a small signalling television tube connected in parallel to the viewing television tube may be used. The increased brightness caused by defects can be collected by means of cylindrical lenses 54 (FIG. 8) mounted on the television tube face 55 and applied to phototransistors 56 assigned to each cylindrical lens. The width of each cylindrical lens corresponds to the channel width of the test specimen. If there are changes in the dimensions of a billet, for example, the subdivisions of the channels effected by the cylindrical lenses on the television tube face emitting the signals may be adjusted to the new width by changing the amplitude of the line sweep voltage correspondingly. Through the signalling television tube with a relatively small screen and thus correspondingly greater brightness it is possible to allow the channels to overlap for a defined distance by mounting overlapping short cylindrical lenses, as shown in FIG. 8, on the video screen. The overlapping ensures that defects which happen to lie exactly between two adjacent channels will be marked.

An additional advantage of the special signalling television tube 55 is that from this arrangement it is possible to obtain information on the whole length of the individual cracks and, thus, on average crack length. If a longer defect is present, then the effect of the brightness on the phototransistor 56 which is assigned to the particular channel lasts longer, whereas for shorter cracks there will be a correspondingly shorter brightness effect. Now, if the phototransistors are combined with triggers 57, which are switched on as long as there is light in front of the phototransistors on the signalling television tube, then these triggers can switch on corresponding counting devices 58 to count the number of scans made for the length of a respective crack in a respective channel. As soon as termination of the crack leads to the extinction of the light in the corresponding channel, the counting operation is terminated and the final value is stored, printed, recorded or otherwise analysed electronically in a unit 59. This means that it is possible to ascertain not only the exact position of a defect on the width of a billet, but its length expressed as a numerical value as well, and all while the billet is passing through.

In the course of the above described analysis of the magnetic powder bands or strips on the semi-finished piece in relation to FIGS. 7 and 8, the scanning beam of the electron emitter was unidimensionally moved to and fro by a pair of deflection coils whereby, at any scan of the electron beam, a special section of the semi-finished piece perpendicular to its longitudinal axis was examined. For this purpose a television camera may be used in which the line scanning pattern is converted into a single line by switching off the sweep voltage for the vertical deflection of the image.

As will be shown below, appropriate electronic defect evaluations may be obtained under certain conditions, if the test specimen is shown as a surface on the signal plate 16 (Vidicon type) or the photo cathode (image orthicon type) instead of as a section, so that the scanning beam can scan the full raster of lines (interlaced or not) as a surface. This surface scanning of the test specimen on a television screen attached to the camera has the advantage that a glance at the screen suffices to see whether the entire arrangement is properly adjusted and in working order.

For the standard British television system, the image surface is scanned by 312.5 lines in 1/50 second. In order to obtain the same analytic evaluation results as with the unidirectional method previously described, the procedure can be as follows: The camera views a certain part of the semi-finished piece, e.g., a 20 cm strip on one side of the billet and as presented to the storage plate or photo cathode. The defect pulses emitted in the course of passage of the electron beam over the powder band image for a period of 1/50 second are counted by an electronic counter. In this fiftieth of a second the part of the billet shown is scanned by 312.5 lines. Thus each line corresponds to a section of the billet 200/312.5 = 0.64 mm in length. Each defect pulse counted in one fiftieth of a second therefore corresponds to a defect length of 0.64 mm. Thus, the entire billet surface displayed is entirely examined for defects in 1/50 second.

In order to obtain uninterrupted defect evaluation for continuous production, a friction wheel, such as the wheel 22 in FIG. 2, driving a tachometer which emits electric pulses, is moved by the moving test pieces 10. By appropriate selection of the pulse generator and the diameter of the friction wheel, it is possible to arrange that one pulse is emitted when the test piece has moved a distance equal to the length of the test piece displayed by the television camera. The pulses emitted on further transport release the electronic counter for a period of 1/50 second which divides the test specimen into short sections whose defect information can be analysed and added as already described.

In order to obtain simple, easily interpretable figures when measuring defect length, etc., it is proposed to simplify the figures obtained from the defect length counter by placing the camera at an appropriate distance from the semi-finished piece and using a mask in front of the signal plate or photo cathode to narrow the line raster. If, for example, a 312.5 mm section of a billet is pictured and 71.2 percent of the picture surface is covered by placing a mask in front of the signal plate, then just 100 mm. of the billet length are shown on the uncovered image section. This 100 mm. billet length, however, corresponds to 100 scanning lines. In the course of counting the defect pulses in the 1/50 second, the electronic counter will simultaneously show the length of the defects in millimeters in the 100 mm. section of the billet being displayed. This figure also represents the specific defect length, i.e., the defect in percent of the tested billet length.

As well as the discrete counting of the defect length in each 1/50 second, i.e., a scanning procedure of the entire image in sections which correspond to the pictured length of specimen, similarly informative data on defects are obtained if during the passage of the specimen by the television camera, the defect pulses counted per fiftieth of a second are indicated, recorded, stored, added, or the billet may be marked with color when a specified length is exceeded. In this procedure of continuous indication of defect pulses per fiftieth of a second, a number is indicated and evaluated which corresponds to the respective defect length in the specimen piece viewed by the television camera.

If the length of section of the test specimen monitored by the camera is not too long, e.g., 1 percent of the billet length in each case, the values of the defect lengths shown continuously and counted per fiftieth of a second, represent the "defect length density."

The continuous registration of this "defect length density" provides significant information, not only concerning the defect density itself, but on the type of defect distribution; if a longer crack is present, then during the passage of this crack, the television camera will provide a value of the number of defect pulses which corresponds to the number of scannings of the section of the specimen shown. If there are two or three cracks next to one another, then the number of defect pulses jumps to double or triple the value. Furthermore, if a constant fluctuation of the defect density to and fro can be observed, this indicates a large number of short defects.

By using several trigger stages adjusted to thresholds of various heights for the electrical pulses originating from the glowing powder shown, the "defect length density" for the corresponding number of defect depth groups may be registered, stored or used to color-mark the specimen with different colors.

The defects may also be displayed on a cathode ray tube whose writing beam intensity is controlled by the pulses and which scans synchronously with the electron beam scanner. By adjusting the brightness and/or contrast of the cathode ray tube, defects whose depths are less than a permissible limit can be eliminated from the picture.

It should be pointed out in particular that all defect evaluating operations for unidimensional scanning of the specimens described above can also be used for two-dimensional scanning of specimens. It makes no difference whether the piece is unidimensionally scanned while it is being transported, or whether it is subjected to two-dimensional scanning and examined for defects in 1/50 second.

It is also evident that by using the method of one or two-dimensional opto-electric scanning of the glowing defects on the specimen in accordance with the technique described above it is possible to test the most varied types of test specimens.

The magnetic powder evaluation method may be used for testing welding seams of pressure or fusion-welded pipes. The pipe, magnetized perpendicularly to the weld seam, is brought into contact with powder emulsion or dry powder in the vicinity of the weld seam and glowing power bands or strips are displayed, registered, stored, printed out and evaluated for color marking of the defective seam. Similarly, in the manner described above, the depth of weld seam defects may also be classified by an analysis of defect depth by triggers with thresholds corresponding to various defect depth groups. It should also be noted that in this application it is possible to suppress the defects which do not exceed the defect depth limits.

A further example is provided by the testing of large pipes for surface defects both on the inside and the outside surfaces. The large pipe is magnetized by a central conductor and sprayed with magnetic emulsion both outside and inside. Then a scanning device, e.g., a television camera, is moved along at a desired distance from the interior and exterior surface while the surfaces are simultaneously radiated with ultraviolet light. Evaluation is accomplished in the manner described above for length and depth of defect, and registered or color-marked.

The same procedure may be carried out with spirally welded pipes having a large diameter. For pipelines running through thickly populated areas it has already been made mandatory by public authorities that a magnetic powder test be carried out as well as other tests, e.g., ultrasonic testing. On the other hand, factory inspection authorities do not permit a person to enter into the spirally welded pipes to carry out a magnetic powder test. The method and apparatus for accomplishing this may include a central current carrying conductor — in the case of surface defects, with A.C. current — to magnetize the interior and exterior surfaces. After the surfaces have been sprayed with magnetic powder emulsion, a scanning device is run through the pipe following the course of the spiral seam of the pipe as the pipe is rotated correspondingly. The evaluation of surface defects in the seam is made according to the methods already described above.

The quantitative magnetic powder test described herein for semi-finished products, may also be used for the quantitative magnetic testing of other mass-produced parts such as bolts, screws, nuts, connecting rods, forged parts, rings, spindles, axles, and the like. In all cases where formerly the magnetic powder method was applied and visually evaluated by inspectors, the scanning procedure described here with the glowing powder bands, may be used as an objective, non-destructive method for the automatic elimination of defective pieces.

What is claimed is:

1. A method of testing ferromagnetic articles for surface defects in which magnetic powder is adhered to the defect areas, comprising:
    forming an image of the magnetic powder on the surface of a light sensitive screen;
    scanning the light sensitive screen with an electron beam for generating electric pulses of magnitude corresponding to the brightness of the magnetic powder image on the screen; and
    generating a train of pulses in response to movement of the articles, accumulating the pulses of said pulse train in a first counter, and accumulating the scanning pulses in a second counter, the quotient of these numbers being formed to denote defect length per unit length of the articles.

2. A method of testing as in claim 1, including the further step of actuating the second counter to count only when an image of the article being tested is on the screen.

3. A method of testing ferromagnetic articles for surface defects in which magnetic powder is adhered to the defect areas, comprising:
    forming an image of the magnetic powder on the surface of a light sensitive screen;
    scanning the light sensitive screen with an electron beam for generating electric pulses of magnitude corresponding to the brightness of the magnetic powder image on the screen; and
    segregating the pulses into different channels in synchronism with the scanning to indicate the location of the defects in different regions of the article tested, wherein the segregation of the pulses is effected by applying them to control the writing beam intensity of a cathode ray tube arranged to scan in synchronism with the electron beam, and by deriving pulses in individual channels from photosensitive devices arranged along the track of the beam on the cathode ray tube screen.

4. A method of testing as in claim 3, wherein the brightness and contrast of the cathode ray tube is so adjusted as to eliminate from the picture defects, the extent of which is less than a predetermined limit.

5. A method of testing ferromagnetic articles for surface defects in which magnetic powder is adhered to the defect areas, comprising:
moving the articles with magnetic powder adhered thereto along a first direction;
forming an image of the magnetic powder on the surface of a light sensitive screen; and
scanning the light sensitive screen with an electron beam along a plurality of adjacent lines transversely of the direction of movement of the articles for generating electric pulses of magnitude corresponding to the brightness of the magnetic powder image on the screen in which the scanning is accomplished through a mask such that the number of effective lines in a raster is so related to the width of the scanned area that the number of pulses counted in one raster represents either the defect length density directly or the specific defect length.

6. A method of determining the presence of defects on the surface of a metal article, which defects are covered by a fluorescent material, comprising the steps of:

directing a beam of light into the defects causing the fluorescent material to fluoresce;
focusing the image of the fluorescing material onto a light sensitive screen;
scanning the light senstive screen with an electron beam for generating electric signals responsive to the image of the fluorescing material on the light sensitive screen;
displaying the electric signals onto a CRT operated in synchronism with the scanning; and
detecting the defect images displayed on the CRT with light sensitive means to identify the defects as to position on the article.

7. Apparatus for testing a ferromagnetic article for surface defects in which magnetic powder is adhered to the defect areas, comprising:
electron beam scanning means located to be activated by the magnetic powder for generating electric pulses of magnitude corresponding to the brightness of the magnetic powder; and
means frictionally engaging said article and moving relatively thereto for generating a pulse train;
a first counter connected to said means for generating a pulse train;
a second counter connected to said electron beam scanning means for accumulating said pulses therefrom; and
means connected to both said first and second counter for forming a ratio of the accumulated pulses in said counters to denote defect length per unit article length.

8. Apparatus for testing a ferromagnetic article for defects in which magnetic powder is adhered to the defect areas, comprising:
electron beam scanning means having a light sensitive screen arranged to receive light images from the magnetic powder and produce pulses of magnitude corresponding to the brightness of said magnetic powder;
cathode ray display means connected to receive the pulses from said electron beam scanning means and form a visual display thereof on a viewing screen;
a plurality of light sensitive means located on said viewing screen for generating electric signals responsive to the illumination of the associated portion of said viewing screen responsive to activation by pulses from said scanning means; and
a trigger electrically connected to said plurality of light sensitive means which is activated on a predetermined number of electric signals being received from said plurality of light sensitive means.

* * * * *